Sept. 6, 1949.  C. DAVIS  2,480,909
MECHANISM FOR RAISING AND LOWERING TRAILER
BODIES RELATIVE TO THE WHEELS
Filed Aug. 13, 1947  2 Sheets-Sheet 1
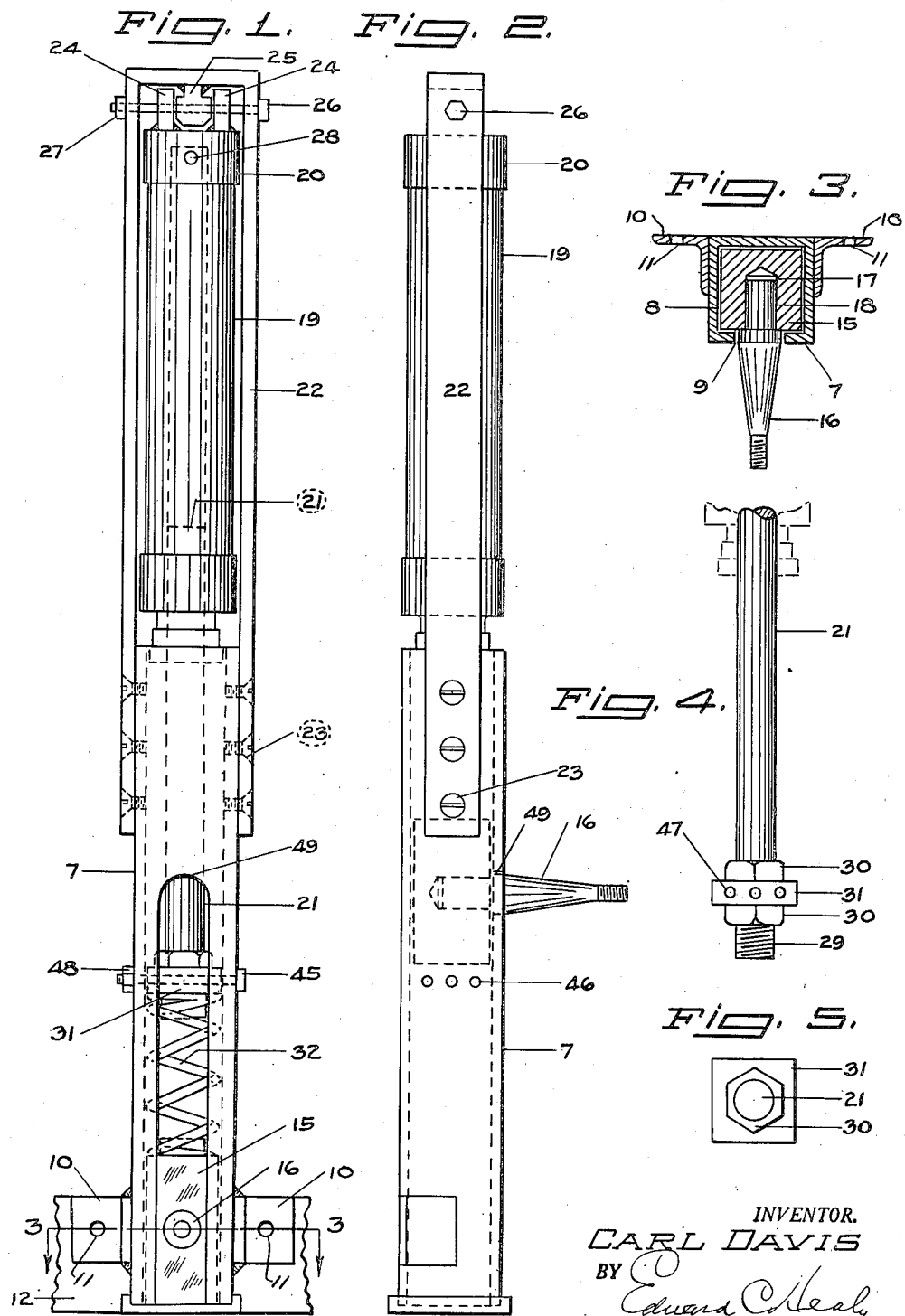
INVENTOR.
CARL DAVIS
BY
Edward C Healy
ATTORNEY Sept. 6, 1949.      C. DAVIS      2,480,909
MECHANISM FOR RAISING AND LOWERING TRAILER
BODIES RELATIVE TO THE WHEELS
Filed Aug. 13, 1947      2 Sheets-Sheet 2
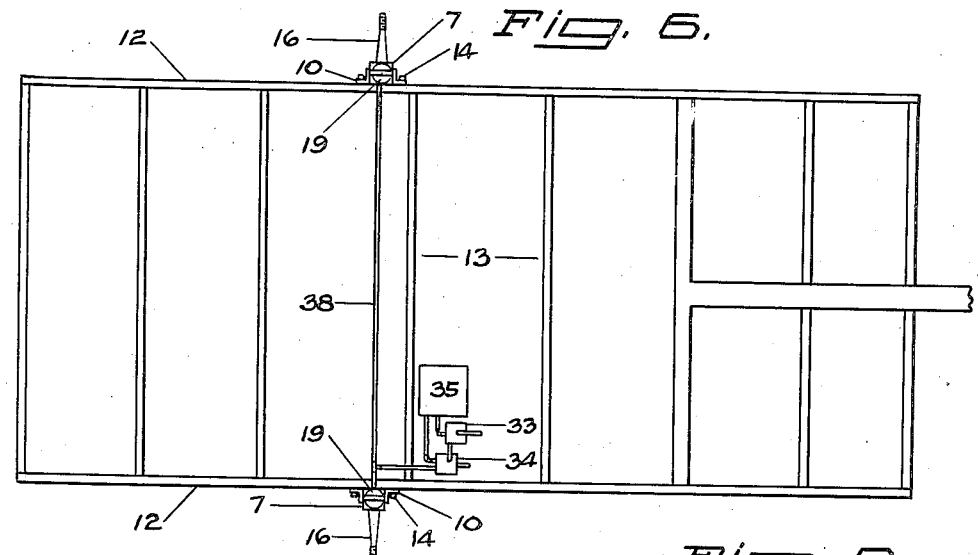
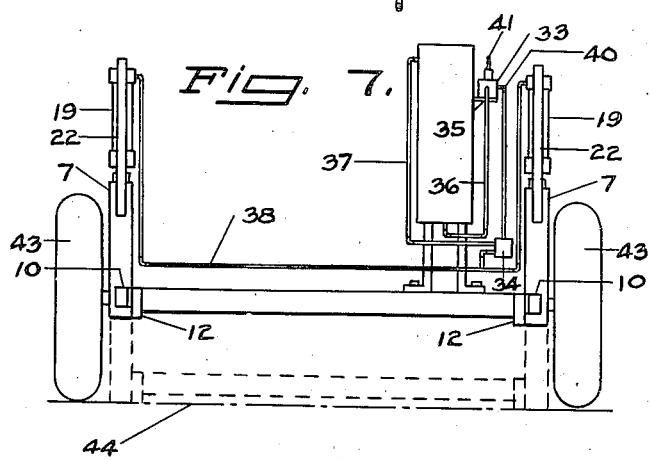
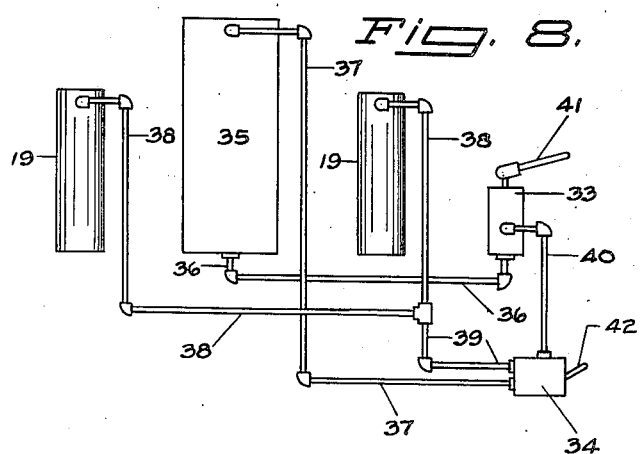
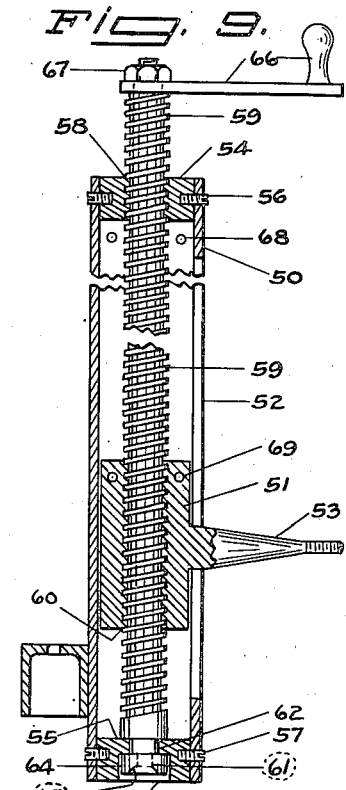
INVENTOR.
CARL DAVIS
BY
Edward C Healy
ATTORNEY Patented Sept. 6, 1949

2,480,909

UNITED STATES PATENT OFFICE 2,480,909

MECHANISM FOR RAISING AND LOWERING TRAILER BODIES RELATIVE TO THE WHEELS

Carl Davis, San Pablo, Calif.

Application August 13, 1947, Serial No. 768,374

1 Claim. (Cl. 280—44)

This invention relates to an improved mechanism for raising and lowering trailer bodies relative to the wheels, and particularly relates to a means for enabling the bed of the trailer to be lowered to the ground and also raised above the ground to any suitable position.

One of the objects of the present invention is the provision of a trailer or other suitable vehicle that can be used as a portable store, such as employed in carnivals, circuses, fruit stands and other marketing stands, along highways, and the like, whereby the bed of the vehicle can be lowered to the ground when it is desired to set up the store and raised to its upper normal running position when it is desired to move to another location.

Another object of the present invention is to secure each axle of the vehicle to a vertically movable plunger and to provide a hydraulic means to lower and raise the plungers upon which the axles are secured.

A further object of the present invention is to preferably form the said plunger of a substantially square configuration and slidably position the plunger in an elongated square hollow bar, which bar is vertically positioned on the vehicle and substantially secured thereto.

A still further object of the present invention is to position a hydraulic cylinder above the said square bar, for enabling the plunger rod from the said cylinder to extend in the said square hollow bar, and to fix a square plate on the lower extremity of the said plunger rod and position a coil spring between the said plate and the top face of the axle plunger, whereby the proper resiliency is provided for supporting the axle.

A still further object of the present invention is to provide means for locking the plunger rod, whereby the various adjustable heights of the vehicle are defined and the load of the vehicle is supported on the said locking means independently from the hydraulic pressure in the cylinder.

A still further object of the present invention is to provide a trailer body raising and lowering mechanism of the character described that is durable, economical to manufacture, simple in construction, positive in operation, and highly efficient and serviceable in use.

Other objects and advantages will be apparent during the course of the following description.

In the accompanying drawings forming a part of the specification, wherein for the purpose of illustration, like numerals designate like parts throughout the same, Fig. 1 is a front elevational view of the device looking toward the outer end of the axle, Fig. 2 is a side elevational view of the device and the axle, Fig. 3 is a transverse sectional view of the plunger and hollow guide taken on line 3—3 of Fig. 1, looking in direction of the arrows, the axle being shown in elevation, Fig. 4 is a vertical side elevational fragmentary view of the plunger rod and plunger rod plate employed in the invention, Fig. 5 is an end elevational view of the said plunger rod and plate, Fig. 6 is a top plan view of a trailer frame and the improved device thereon, Fig. 7 an end elevational view of the trailer frame and the wheels thereof, also showing a wheel extending and retracting member positioned on each side of the trailer frame and over the axles, illustrating the frame in its upper normal running position and also showing the frame, in dotted lines, in its lower position, Fig. 8 is a diagrammatic view illustrating, in principle, the fluid conveying system employed in the invention, and Fig. 9 is a vertical sectional view of a modified form of the invention.

Referring in detail to the drawings and to the numerals designating the different parts thereof, the numeral 7 designates an elongated substantially square bar formed hollow as at 8 and slotted in the outer front face thereof as at 9, shown to advantage in Figs. 1 and 3. A pair of oppositely disposed angle members 10 preferably apertured as at 11, are welded to the sides of the hollow bar, whereby the bar can be secured to the sides 12 of the frame 13 by suitable bolts 14 as shown in Fig. 6, or rigidly welded to the frame if desired. A suitable substantially square plunger 15, constructed in any suitable manner is slidably positioned in the hollow bar 7, the said plunger carrying a conventional axle 16. The said plunger is apertured as at 17 and the axle is formed with a reduced portion 18, which reduced portion 18 is pressed into the plunger as shown in Fig. 3, whereby the axle and plunger are made integral one with the other.

The numeral 19 designates a fluid pressure cylinder, having a removably secured cap 20 and provided with an elongated plunger rod 21. The said cylinder 19 is secured to the hollow bar 7 through the medium of an inverted U-shaped hanger 22, which hanger is shown as being removably secured to the bar by a plurality of suitable screws 23. However, the hanger can be welded to the bar if desired. A pair of vertically extending ears 24 are welded to the top of the cap 20 and a downwardly extending ear 25 is centrally positioned on the inner top face of the hanger 22 and is rigidly welded thereto and extends between the ears 24 on the cylinder. A suitable bolt 26 projects through the said ears and sides of the hanger, as shown to advantage in Fig. 1, and is secured to the hanger by a nut 27, whereby the hanger is retained in position above the cylinder. A threaded inlet opening 28 is provided in the upper portion of the cylinder for admitting fluid therein above the plunger rod 21. The lower portion of the plunger rod is threaded as at 29 for receiving a pair of threaded nuts 30, whereby an apertured square plate 31 having a sliding fit in the hollow bar 7, is retained on the lower portion of the plunger rod as shown to advantage in Fig. 4. A coil spring 32 is positioned in the hollow bar between said plate 31 and the top face of the plunger 15, whereby the proper resiliency is provided for supporting the vehicle.

The hydraulic mechanism and system provided for supplying the necessary fluid pressure to the cylinders for raising the trailer body from the ground is illustrated in Figs. 7 and 8 and includes a suitable pump 33, a conventional two way valve 34 and a fluid pressure tank 35. The numeral 36 designates a pipe line leading from pump 33 to the bottom portion of the tank 35. The numeral 37 designates a pipe line leading from the valve 34 to the top portion of the said tank. The numeral 38 designates a pipe line extending across the trailer body to the top portions of the cylinders, connecting the cylinders one to the other, and the numeral 39 designates a pipe line leading from the valve 34 to the said cylinder connecting line 38. The numeral 40 designates a pipe line leading from the pump 33 to the valve 34. Numerals 41 and 42 designate the pump handle and valve handle, respectively. The numeral 43 designates the wheels of the vehicle and the numeral 44 the ground line. The drawings shown in Figs. 7 and 8 illustrate the hydraulic system in principle, it being understood that the pump, valve, tank and various pipes can be of any suitable type and supported and arranged in any suitable manner to properly serve the purpose of the invention.

In Figs. 1 and 7 there is illustrated to advantage the normal position of the trailer frame relative to the axle and wheels when the trailer is in its normal running position. It will be particularly observed that when the trailer is in its said running position, the axle is in the lower portion of the hollow bar 7 and is retained in that position by the bolts 45 extending through the holes 46 in the sides of the hollow bar 7 and the holes 47 in the plunger rod 21 and plate 31. Suitable pins or lock nuts 48 secure the said bolts to the bar. When it is desired to lower the trailer to the position shown in dotted configuration in Fig. 7, the said bolts are removed and the lowering of the trailer body will cause the hydraulic cylinders to move downwardly on the plunger rod 21, whereby the plunger 15 and axle 16 will take the position in the hollow bar as shown in Fig. 2, the said hollow bar and trailer frame moving to the ground line 44 as shown to advantage in Fig. 7, in which position the axle rod 16 rests against the upper extremity 49 of the slot 9 in the hollow bar. A small amount of hydraulic pressure can be applied against the plunger 15 for cushioning the lowering of the trailer. When it is desired to raise the trailer the pump is operated and the valve 34 is opened to the lines 39 and 40. The oil is pumped from the tank 35 through the line 36 and to the valve 34 through line 40 and thence to the upper inlets 28 of the hydraulic cylinders and against the upper ends of the plunger rods 21 therein through 39 and 38, whereby the hydraulic pressure exerted against the said plunger rods will pull the hollow bar 7 and trailer frame secured thereto upwardly to the normal running position shown in Figs. 1 and 7 and in which position the bolts 45 lock the plunger rod to the hollow bar.

In Fig. 9 there is shown a modified form of the invention embodying the same principle of securing the vehicle axle to a plunger as set forth in the foregoing description, but providing a mechanical principle for adjusting the horizontal relationship of the trailer body with respect to the wheels. In the said modified form of the invention the numeral 50 designates the elongated substantially square hollow vertical bar and the numeral 51 a substantially square plunger slidably positioned therein. The said hollow bar is vertically slotted as at 52 for accommodating the wheel axle 53, which axle is fixed to the said plunger in any suitable manner. The said hollow bar is provided with an upper end member 54 and a lower end member 55, which end members 54 and 55 are retained within the bar and substantially secured thereto by suitable screws 56 and 57, respectively. The upper end member 54 is internally threaded as at 58 for accommodating a suitable jack screw 59, which jack screw threadedly extends into and through the axle plunger 51 as at 60. The lower portion of the jack screw 59 is reduced in diameter as at 61 and extends through an aperture 62 provided in the lower end member 55, the said lower end member being recessed as at 63 for accommodating the collar 64 that is positioned on the said reduced end portion 61 which end portion is secured to the collar by being peened therein as at 65. A suitable handle 66 is secured to the upper extremity of the jack screw by the lock nut 67. Suitable holes 68 and 69 are provided through the hollow bar 50 and axle plunger 51, respectively, whereby the plunger can be locked by suitable bolts in the required position. From the foregoing description taken in conjunction with the accompanying drawing it is obvious that when circumferential movement is imparted to the jack screw the plunger 51 carrying wheel axle 53 will vertically move on the said jack screw and a wheel on the axle will thus be raised or lowered relative to the body of the trailer. The hollow bar 50 is resiliently secured, vertically, to the body of the trailer in any suitable manner.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

In combination with a vehicle body and the wheels supporting the same, a device of the character described comprising an elongated hollow bar vertically positioned on the vehicle body, a cylinder vertically positioned above the said hollow bar and secured thereto, a vertical plunger rod slidably positioned in the cylinder, a plate fixed on the lower end portion of the plunger rod and slidably mounted within the hollow bar, a plunger slidably mounted in the hollow bar and positioned beneath the said plate, a wheel axle fixed in the said plunger and horizontally extending therefrom, a slot vertically formed through one side of the hollow bar for enabling the wheel axle to horizontally extend through the bar for vertical movement relative thereto, means for locking the said plate to the hollow bar, a coil spring positioned between the said plate and plunger to provide resiliency for the wheel axle, and means for producing hydraulic pressure in the cylinder against the said plunger rod, whereby the vertical position of the vehicle is varied relative to the wheel axle.

CARL DAVIS.

REFERENCES CITED

The following references are of record in the file of this patent:

UNITED STATES PATENTS

| Number | Name | Date |
|---|---|---|
| 1,340,416 | Schneider | May 18, 1920 |
| 2,002,605 | Kincaid | May 28, 1935 |